(12) United States Patent
Wilson

(10) Patent No.: US 7,110,915 B2
(45) Date of Patent: Sep. 19, 2006

(54) MULTIPLE CONCURRENT RECURSIVE LEAST SQUARES IDENTIFICATION WITH APPLICATION TO ON-LINE SPACECRAFT MASS-PROPERTY IDENTIFICATION

(76) Inventor: Edward Wilson, 454 Barkentine La., Redwood City, CA (US) 94065-1126

( * ) Notice: Subject to any disclaimer, the term of this patent is extended or adjusted under 35 U.S.C. 154(b) by 31 days.

(21) Appl. No.: 10/841,117

(22) Filed: May 6, 2004

(65) Prior Publication Data
US 2005/0049829 A1    Mar. 3, 2005

Related U.S. Application Data

(60) Provisional application No. 60/468,411, filed on May 6, 2003.

(51) Int. Cl.
*G06F 7/00*    (2006.01)
(52) U.S. Cl. .......................... 702/181; 701/13
(58) Field of Classification Search ................ 702/41, 702/57, 189–191, 196, 181; 701/1, 3–5, 701/13, 36; 703/2; 244/164–165, 171
See application file for complete search history.

(56) References Cited

U.S. PATENT DOCUMENTS

| | | | | |
|---|---|---|---|---|
| 4,623,106 A | * | 11/1986 | Price et al. | 244/3.1 |
| 5,562,266 A | * | 10/1996 | Achkar et al. | 244/171 |
| 6,278,908 B1 | * | 8/2001 | Durham | 700/262 |
| 6,295,021 B1 | * | 9/2001 | Lichten et al. | 342/355 |
| 6,340,138 B1 | * | 1/2002 | Barsky et al. | 244/165 |
| 6,411,871 B1 | * | 6/2002 | Lin | 701/27 |

OTHER PUBLICATIONS

Wilson et al., "On-line, gyro-based, mass-property identification for thruster-controlled spacecraft using recursive least squares", Aug. 2002, Circuits and Systems, 2002. MWSCAS-2002, vol. 2, pp. 334-337.*
Wilson et al., "Gyro-based maximum-likelihood thruster fault detection and identification", May 2002, American Control Conference, 2002, vol. 6, pp. 4525-4530.*
Peck, "Estimation of Inertia Parameters for Gyrostats Subject to Gravity-Gradient Torques", Jul. 30-Aug. 2, 2001, AAS/AIAA Astrodynamics Specialist Conference, Paper AAS 01-308, pp. 1-21.*
Peck, "Mass-Properties Estimation for Spacecraft with Powerful Damping", Aug. 16-19, 1999, AAS/AIAA Astrodynamics Specialist Conference, Paper AAS 99-430, pp. 1-21.*

* cited by examiner

*Primary Examiner*—Marc S. Hoff
*Assistant Examiner*—Mary Catherine Baran

(57) ABSTRACT

The present invention is a method for identifying unknown parameters in a system having a set of governing equations describing its behavior that cannot be put into regression form with the unknown parameters linearly represented. In this method, the vector of unknown parameters is segmented into a plurality of groups where each individual group of unknown parameters may be isolated linearly by manipulation of said equations. Multiple concurrent and independent recursive least squares identification of each said group run, treating other unknown parameters appearing in their regression equation as if they were known perfectly, with said values provided by recursive least squares estimation from the other groups, thereby enabling the use of fast, compact, efficient linear algorithms to solve problems that would otherwise require nonlinear solution approaches. This invention is presented with application to identification of mass and thruster properties for a thruster-controlled spacecraft.

15 Claims, No Drawings

MULTIPLE CONCURRENT RECURSIVE LEAST SQUARES IDENTIFICATION WITH APPLICATION TO ON-LINE SPACECRAFT MASS-PROPERTY IDENTIFICATION

This application claims the benefit of the filing date of the previously filed provisional patent application, No. 60/468,411, filed on May 6, 2003.

FEDERALLY SPONSORED RESEARCH

This invention was made with Government support under contract number NAS2-00065 awarded by NASA. The Government has certain rights in the invention.

COMPUTER PROGRAM LISTING COMPACT DISK APPENDIX

Selected files used to implement a simulation of the invention, as applied to a thruster controlled spacecraft, are provided in MATLAB m-code on CD-R. All code is copyright Edward Wilson. One original and one identical copy are provided. Machine format: IBM PC/XT/AT, or compatibles. Operating system compatibility: MS-Windows. Line Terminator: ASCII Carriage return plus ASCII Line Feed. Control codes: none. Compression: uncompressed data. A printed listing of the files on the CD-R is also provided as an appendix to this specification.

BACKGROUND

1. Field of the Invention

The present invention relates generally to information processing systems that are used to identify unknown parameters in a system, and more specifically to an information processing system that monitors motion-related sensors to accurately identify spacecraft mass-properties. The general field is commonly known as System Identification (ID).

2. Prior Art

The use of linear least squares regression for the identification of unknown system parameters has been used and studied extensively, as by Lawson, C. and Hanson, R., in *Solving Least Squares Problems*, 1974, and Ljung, L., in *System Identification, Theory for the User*, 1999. However, the requirement that a regression equation be formed with the unknown parameters linearly represented, limits its direct applicability to many important problems, including the spacecraft application presented here.

Ljung and several other authors have developed approaches for identification of parameters in highly nonlinear systems using methods such as gradient-based optimization and neural networks. However, these methods are significantly more computationally intensive than those for linear problems.

The remaining prior art items relate more specifically to the spacecraft mass-property ID aspect of the invention. In that problem, some of the unknown parameters multiply each other in the governing equations, resulting in a specific type of nonlinearity.

Tanygin, S. and Williams, T., in "Mass property estimation using coasting maneuvers," *Journal of Guidance, Control, and Dynamics*, 1997, developed a least squares (LS) based algorithm to identify mass properties for a spinning vehicle during coasting maneuvers. The restriction to the case of a spinning spacecraft with no applied torques or thrusters firing limits its applicability considerably—either to spacecraft that normally exist in this state, or by requiring other spacecraft to attain this state.

Bergmann, E., et al., in "Mass property estimation for control of asymmetrical satellites," *Journal of Guidance, Control, and Dynamics*, 1987, developed an ID approach using a Gaussian second-order filter as presented more generally by Gelb, A, et al., in *Applied Optimal Estimation*, 1974. The second order filter resembles an extended Kalman filter, but has extra terms to address the second order effects. This is significantly more complex and computationally intensive (by about two orders of magnitude) than the approach presented here, and may not produce better results for most spacecraft. The extra complexity may make it more susceptible to noise and parameter variations than the presented methods. It assumes perfect knowledge of thruster properties.

Wilson, E. and Rock, S. M., in "Reconfigurable control of a free-flying space robot using neural networks," Proceedings of the American Control Conference, 1995, developed an ID method based on exponentially weighted RLS using accelerometer and angular rate sensors. The acceleration created by each thruster (reflecting both mass and thruster properties) was identified. This approach (identifying thruster acceleration rather than separately identifying mass and thruster properties) is more direct (since thruster acceleration is the real value of interest from a control, estimation, or FDI standpoint), and probably better for vehicles with properties that are truly unknown (such as for the case where deflected thrusters are allowed, such as on the vehicle tested in that research). However, for most vehicles, certain properties are well known, such as the thrust directions and locations in the structural frame. The present invention can take advantage of that knowledge to get better estimates of the properties that are not well known.

BACKGROUND—OBJECTS AND ADVANTAGES

In System ID, there is presently an extremely large step taken in terms of computational complexity when tackling a nonlinear vs. linear problem. The present invention addresses this for a broad class of problems, providing a novel approach to enable nonlinear system ID problems to be solved with linear methods.

With regard to the spacecraft mass-property ID problem, due to the very small forces and torques present on spacecraft on orbit and in free space, their mass properties are important from a control and estimation standpoint. Spacecraft mass properties can only be calibrated with limited accuracy during ground testing, and change further once on orbit due to expulsion of fuel mass, reconfiguration (of antennae, etc.), and for servicing robotic spacecraft, potentially variable payloads. Accurate ID of mass properties has been studied extensively as reported in the prior art, but those methods have not yet been implemented and tested on an actual spacecraft, possibly due to the computational complexity involved.

The present invention was originally developed to address the spacecraft mass-property ID problem, and then extended to the general case. It enables highly accurate mass-property ID and is very simple, compact and fast. It has been implemented on an experimental spacecraft, tested on-board in zero-g aircraft testing, and is presently awaiting launch for space-based validation.

Specifically, the primary object of the invention is an algorithm that enables the application of very powerful, fast, and compact system ID algorithms to a class of problems that prior to this required solution with much more computationally intensive, and fragile nonlinear approaches. It has been found to provide near-ideal results in testing on a realistic, important, and well-formed example application, where ideal indicates that the approximation error made in allowing this nonlinear problem to be solved with linear methods results in a negligible loss of accuracy in the ID result.

BRIEF SUMMARY OF THE INVENTION

The present invention is a method for identifying unknown parameters in a system having a mathematical model describing its behavior and one or more measurements that are sampled regularly, and where the system's governing equations cannot be manipulated into a form allowing (direct) linear regression of the unknown parameters. In this method, the single nonlinear problem is segmented into a plurality of separate problems that are exactly linear, thereby enabling the application of existing powerful linear regression algorithms such as recursive least squares. The individual linear sub-problems contain unknown parameters other than those that are identified; said parameters are initially set at their nominal values, and are subsequently updated by the other ID processes, which are running concurrently. With all sub-problems sharing their results following each update, the results rival those of more computationally intensive nonlinear optimization algorithms. As long as reasonable initial parameter estimates are available, the approximation error for the spacecraft mass-property ID example is significantly smaller than that created by other un-modeled system parameters.

BRIEF DESCRIPTION OF DRAWINGS

Not Applicable.

DETAILED DESCRIPTION OF THE INVENTION

This section first describes the general aspect of the invention, followed by the specific spacecraft application. The general aspect of the invention, referred to as multiple concurrent recursive least squares identification (or MCRLS ID), is presented first using a very simple math example to highlight the novelty of the approach, and then in general form to demonstrate its generality.

In least squares (LS) ID, unknown parameters are identified using algorithms in which measurement data is fit to the underlying governing equations such that the identified parameter values minimize the squared error (where error is, for example, measurement data minus the ideal measurement data that would occur with zero noise and using the identified parameter values).

As reported in the prior art, the standard form for a linear least squares problem, referred to as "regression form" is given as $$Ax = b + \epsilon \quad (1)$$

or, equivalently, $$Ax \approx b \quad (2)$$

where b is a vector of (perfect) measurements, $\epsilon$ is a vector of measurement noise, x contains the parameters to be identified, and matrix A contains known variables system parameter values (i.e., A is noise-free). The $\approx$ in the $Ax \approx b$ representation indicates that the left and right sides of the equation would be equal if noise were not present. The LS ID solution, $\hat{x}$, minimizes the sum of the squares of the elements of the error, $A\hat{x}-b$. If the problem at hand can be put into regression form, with noise appearing only in the $\epsilon$ term, $\hat{x}$ can be solved directly (i.e., this is a closed-form solution, rather than an iterative optimization as might be required if the equations can not be put into this form) using one of the following equations:

Unweighted, batch algorithm: $\hat{x}=(A^TA)^{-1}A^Tb$ (3)

Weighted, batch algorithm: $\hat{x}=(A^TWA)^{-1}A^TWb$ (4)

W is a diagonal weighting matrix. Either of these algorithms can be made recursive, and the weighting matrix, W, can be chosen to weight the data according to an exponentially decaying function—as is commonly done when implemented recursively. The recursive and batch solutions are identical since they minimize the same cost function.

In practice, many times the governing equations do not immediately fit exactly the form $Ax=b+\epsilon$, with, for example, noise being present in the A matrix and the x not being immediately and linearly separated from A and b as required. So the basic approach to LS ID is to find some governing equations (the equations of motion, for example) that contain the parameter values to be identified and measurement data. Then these equations are manipulated to conform to the $Ax \approx b$ formulation, possibly requiring approximations along the way (dropping higher order terms, for example).

In some problems, such as the spacecraft example, it is not possible to drop the nonlinear terms, since they are significant. A simple example that highlights this situation is presented by the following governing equation:

$$c_1 x_1 + c_2 x_2 + c_{12} x_1 x_2 \approx b \quad (5)$$

Where b is the measurement, $c_1$, $c_2$, and $c_{12}$ are known values, that vary from measurement to measurement, and $x_1$ and $x_2$ are the unknown parameters to be identified. This problem cannot be put into the form of Equation 2, where the A matrix does not contain x. One approach that is feasible for a problem of this simplicity is to let $$A=[c_1\ c_2\ c_{12}]; x=[x_1\ x_2\ x_1 x_2]^T \quad (6)$$

With the equation now in regression form, $\hat{x}$ could be solved readily. However, depending on the noise present, the third element is unlikely to equal the first times the second. One approach would be to ignore the third ID element, but this is throwing away information.

The present invention would solve this problem by accepting the fact that it cannot fit directly into regression form, and breaking it into two parts that can directly fit. $\hat{x}_1$ is to be ID'ed assuming that $x_2$ is perfectly known, and vice versa. So the equations are re-written as:

$$(c_1+c_{12}\hat{x}_2)x_1 = b - c_2\hat{x}_2$$

$$(c_2+c_{12}\hat{x}_1)x_2 = b - c_1\hat{x}_1 \quad (7)$$

or, in matrix form, $$\begin{bmatrix} c_1 + c_{12}\hat{x}_2 & 0 \\ 0 & c_2 + c_{12}\hat{x}_1 \end{bmatrix} \begin{bmatrix} x_1 \\ x_2 \end{bmatrix} = \begin{bmatrix} b - c_2\hat{x}_2 \\ b - c_1\hat{x}_1 \end{bmatrix} \quad (8)$$

The first equation is set up to ID $x_1$, and treats $x_2$ as if it were a known quantity, substituting in the best estimate of $x_2$, $\hat{x}_2$. $\hat{x}_1$, can now be solved directly. The second equation does the converse. If $\hat{x}_1$ and $\hat{x}_2$ are estimated recursively, with updated estimates shared with the other ID, and if the initial estimates are sufficiently accurate, the individual IDs converge correctly. It would be possible to implement this using a single Recursive least squares (RLS) ID using Equation 8, or two RLS IDs using Equation 7. The latter method is the preferred embodiment.

One test for the error introduced by this approximation is to run a simulation where in one case the secondary parameters (e.g., $\hat{x}_2$ in the top equation) are set to their true values, and in a second case they are set by the other ID process, and to compare the accuracies of the ID results. In many real applications, including the spacecraft example, this approximation error is insignificant as compared to system disturbances and other unknown parameters in the system. In any real problem, there are always some additional unmodeled effects, and as long as the approximation error is significantly smaller than the error introduced by ignoring these effects, the approximation should be considered.

It should be clear to those skilled in the art that this approach can be extended to cases where the vector of unknown parameters, x, is divided into an arbitrarily large number of groups, each containing an arbitrarily large number of parameters. The preferred embodiment is to use as few groups as possible to preserve the individual exact linear solutions to the extent possible.

Another extension is that the ID algorithms used by each group could be something other than RLS, and could still fit directly into the structure presented.

Equations describing an arbitrary number of arbitrarily sized groups is as follows, where the subscripts indicate the number for the group of parameters, and the groups can be arbitrarily sized:

$$A_1(\hat{x}_2, \cdots, \hat{x}_2, \cdots)x_1 = b_1(\hat{x}_2, \cdots, \hat{x}_n, \cdots) \quad (9)$$

$$A_2(\hat{x}_1, \hat{x}_3, \cdots, \hat{x}_n, \cdots)x_2 = b_2(\hat{x}_1, \hat{x}_3, \cdots, \hat{x}_n, \cdots)$$

$$\vdots$$

$$A_n(\hat{x}_1, \cdots, \hat{x}_{n-1}, \cdots)x_n = b_n(\hat{x}_1, \cdots, \hat{x}_{n-1}, \cdots)$$

The first line in this equation is used as the regression equation in a RLS ID solution of the vector of unknown parameters, $\hat{x}_1$. And so on for each group up to n.

When performing RLS ID, as covered in the prior art, the accuracy of the ID depends on the selection of good values for the initial parameter estimates and the estimated covariance for the error in those estimates. It is also important to weight each subsequent measurement appropriately, first according to the estimated covariance of the measurement error, and second to exponentially weight the data so that newer measurements are considered more important than older ones (this is not strictly required, but is commonly done to allow the ID to track true changes in system parameters, and is a trivial adjustment to the RLS ID algorithm to implement). When using the present invention, careful selection of these parameters is even more important, since the IDs are dependent on each other.

As a practical consideration, it is common for the unknown parameters in a system to have widely varying degrees of uncertainty. For example, in the spacecraft example, due to the accuracy of ground-test equipment, center of mass is known with better relative accuracy than the diagonal terms in the inertia matrix, which are known better than the off-diagonal terms. Thruster locations are known very well, thruster directions are less certain, and for some systems, the thruster magnitude is even less certain. The capability of the present invention to accommodate these problem characteristics is an important one.

An additional benefit of the present invention is that some measurements are more directly related to some parameters than others, and this can be accommodated. For example, in the spacecraft example, when thrusters are fired to produce a pure torque, the resulting rotational motion as measured by the gyros is independent of the center of mass. Any update to the center of mass ID using this data is based on noise rather than physics and should be avoided. With the ID already segmented, this and other similar steps are easily implemented.

If the uncertainties in the initial estimates are set too high, and the measurements are noisy, there is a chance that one of the IDs will diverge initially. The dependence of the other IDs on this makes it especially important. So it may be helpful to perform an outlier check on the measurements and prevent this from happening. If the estimate error covariances are set properly and the measurements are free of outliers, this is not a concern.

Note that even with careful P matrix initialization and measurement weighting, MCRLS ID can only approach the mathematical optimality of a Kalman Filter or the results of a nonlinear optimization. However, for many applications, this sub-optimality is insignificant in the presence of the numerous other approximations and dropped terms.

Another benefit that is especially valuable for systems requiring on-line implementation on embedded processors where code size may be limited is that the code is very small. The RLS implementation consists of a small number of lines of code, due to the simplicity of the RLS algorithm (from prior art), and it can be shared by the individual IDs, leading to a significant savings in code size, and the time and cost for development, testing, and sustaining engineering.

Detailed Description—As Applied to Spacecraft Mass-Property ID

The ID method is described in detail as follows, as applied to spacecraft mass- and thruster-property ID. Unless otherwise stated, the specifics of the method refer to the preferred embodiment.

The rotational and translational equations of motion for a thruster controlled spacecraft can be written as follows, where ω is a 3-by-1 vector containing the angular velocity of the body-fixed frame with respect to an inertial reference frame; I, is a 3-by-3 matrix containing the spacecraft inertia tensor (also, dyadic, matrix), measured about the true center of mass; L is a 3-by-n matrix containing x-y-z location of each thruster in the body frame; n is the number of thrusters; D is a 3-by-n matrix containing unit vectors indicating the direction of thrust in the body frame; $S_k$ is a scalar containing thruster magnitude scale factor applied to all thrusters. Includes effects of blowdown and the reduction in thrust when multiple thrusters are fired; $F_{nom}$ is a n-by-n diagonal matrix containing nominal strength of each thruster at full tank pressure; $F_{bias}$, $\hat{F}_{bias}$, $\tilde{F}_{bias}$ (true, estimated, and error variants given here) is a N-by-N diagonal matrix containing constant off-nominal strength of each thruster at full tank pressure, $F_{bias} = \hat{F}_{bias} + \tilde{F}_{bias}$; $F_{random,k}$ is a N-by-N diagonal matrix containing pulse-to-pulse off-nominal strength of each thruster at full tank pressure; $T_k$ is a n-by-1 vector of 1's and 0's containing effective value for which thrusters fire at time step k, accounting for transient effects; $\tau_{disturb}$ is a 3-by-1 vector containing sum of all torques on the vehicle resulting from other sources (drag, gravity gradient, separately modeled known thruster anomalies, CMG, RWA, and other calculable dynamic effects, etc.); $\ddot{x}^{body}$ is a 3-by-1 vector containing vehicle translational acceleration, measured in the body frame; m is a scalar containing total vehicle mass; and $$f^{body}_{disturb}$$

is a 3-by-1 vector containing the net force on the vehicle through the center of mass, with the body superscript indicating measurement in the body frame:

$$\dot{\omega} = I^{-1}((L \times D)S_k(F_{nom} + F_{bias} + F_{random,k})T_k + \tau_{disturb} - x(I\omega)) \quad (10)$$

$$\ddot{x}^{body} = m^{-1}(DS_k(F_{nom} + F_{bias} + F_{random,k})T_k + f^{body}_{disturb}) \quad (11)$$

The rotational equation, contains all of the parameters we would like to identify, including CM location (contained in L), inertia (and its inverse), and $F_{bias}$. Unfortunately, the parameters multiply one another, and cannot be manipulated into the desired linear form, $Ax \cong b$. One approach would be to develop a nonlinear, gradient-based optimization of these parameters using the full equations of motion. While possible, that approach would be significantly more complex and may not produce better results than the approach taken here, which is to segment the identification problem into multiple sub-problems which each allow closed form solution of the least squares problem.

The thruster bias, CM location, inertia, and inverse-inertia will be identified individually by concurrently running RLS IDs according to the MCRLS ID approach. Note that depending on the application, not all of these values will be uncertain enough or critical enough to warrant ID. $\hat{I}^{-1}$ will not exactly equal the inverse of $\hat{I}$. The equations work out to make $\hat{I}$ more accurate, but all IDs are presented here.

The IDs are initialized with the best prior parameter estimates (e.g., the nominal values). The respective estimate error covariance matrices are set according to the confidence in the initial nominal values. Then the RLS updates include weighting according to the sensor error covariance matrices. At each RLS update, a given ID will use the most recent estimates for other parameters being ID'ed (for example, CM ID would use the most recent estimates for inertia and thruster bias). The overall approach may be extended to other parameters in the governing equations (for example, the thruster directions) if they have sufficient variability and impact as to justify ID.

MCRLS relies on the coupling between different parameter variations to be small, so if thruster bias and inertia ID are tightly coupled, and they both have high variances (e.g., parameter values can be +/−50%), this approach may not work well.

There is a component of the vehicle mass properties that can be calculated fairly well: the change in mass as fuel is depleted. The effect of this on the change in mass properties is calculated and is referred to as burn-time-integration (BTI). BTI information after each thruster firing is used to update the nominal mass properties. The mass ID is designed to ID the difference between true and nominal mass properties. The thought is that if the BTI is not perfectly accurate the mass ID will partially account for that. It should be clear to those skilled in the art that this approach can be extended more generally to MCRLS ID where an aspect of one or more unknown parameters changes in a known manner.

$\hat{I}$ and $\hat{I}^{-1}$ are symmetric, so instead of 9 free parameters in each, there are only 6 in each. The identifications are designed to directly identify these 6 parameters.

When a pure torque is applied (i.e., the net force is zero), the resulting angular motion is independent of CM location, so the accuracy of inertia ID updates is not affected by inaccuracy in the estimated CM location. If the ID error introduced by this un-modeled coupling is a concern, inertia ID updates may be made only during times when a pure torque is applied (following the philosophy that fewer clean data points may be better than more noisy ones—and the fact that the CM-estimate error would bias the estimate).

If using angular measurements only (e.g., with gyros), the CM is observable only when net translational thrust is applied (this is a corollary to the previous statement), so the CM ID is updated only at these times.

The following algorithms enable on-line ID of inertia, inverse inertia, and center of mass using rotational measurements only, as would commonly be available with gyros. Angular acceleration is required as a minimum, and the use of angular rate as well allows accounting for the gyroscopic term ($\omega \times (I\omega)$) in the governing equations. Thruster strength ID can be performed using rotational measurements alone, or with the additional use of translational acceleration measurements.

The center of mass, C, determines the origin of the body frame, and thereby determines the value of L, which contains the locations of each thruster in the body frame. Similarly, $\Delta_C$, the difference between actual and nominal values of C determines L. $\Delta_C$ is the value that will be identified here. J is assumed to be known perfectly; $C_{nom}$ is assumed to be known perfectly, including continual updates based on burn-time integration; $L_{nom}$ can then be calculated directly using these; C, and therefore L and $\Delta_C$ also, is the true quantity which cannot be known perfectly; $\hat{\Delta}_C$ is the identified quantity, which then leads directly to $\hat{C}$ and $\hat{L}$. This is done similarly for inertia and inverse inertia.

$$\Delta_C \triangleq C - C_{nom} \quad (12)$$

$$\Delta_I \triangleq I - I_{nom} \quad (13)$$

$$\Delta_{I^{-1}} \triangleq I^{-1} - I_{nom}^{-1} \quad (14)$$

$$L = L_{nom} - \Delta_C[1 \ 1 \ \ldots \ 1] \quad (15)$$

Following the MCRLS method described earlier, the rotational EOM is manipulated into forms that will enable the required IDs, individually. In the following, the values of the A, x, and b variables from the general regression form are listed for each individual ID. A few variables are defined now to represent quantities that appear in more than one regression equation.

$$a_k \triangleq (L_{nom} \times D)S_k(F_{nom} + \hat{F}_{bias})T_k + \hat{\tau}_{disturb} \quad (16)$$

$$c_k \triangleq DS_k(F_{nom} + \hat{F}_{bias})T_k \quad (17)$$

-continued $$d_k \triangleq a_k + c_k \times \hat{\Delta}_C - \hat{\omega} \times (\hat{I}\hat{\omega})$$ (18)

The regression form equation for center of mass ID using gyros only is:

$$A_k = \hat{I}^{-1} \begin{bmatrix} 0 & -c_{k,3} & c_{k,2} \\ c_{k,3} & 0 & -c_{k,1} \\ -c_{k,2} & c_{k,1} & 0 \end{bmatrix}, \quad x = \begin{bmatrix} \Delta_{C,1} \\ \Delta_{C,2} \\ \Delta_{C,3} \end{bmatrix},$$ (19)

$$b_k = \hat{\omega} - \hat{I}^{-1}(a_k - \hat{\omega} \times (\hat{I}\hat{\omega}))$$

The identified value for $\hat{\Delta}_C$ is then added to the nominal center of mass, to give the center of mass estimate. As mentioned earlier, and as is present in these other IDs, ID of the deviation from nominal facilitates the integration of known changes in parameters, such as that due to the burn-time integration of fuel mass change and its effect on the nominal mass properties.

$$\hat{C} = C_{nom} + \hat{\Delta}_C$$ (20)

The regression form equation for inverse-inertia-matrix ID using gyros only, where the gyroscopic term is treated as a disturbance is:

$$A_k = \begin{bmatrix} d_{k,1} & & & d_{k,2} & d_{k,3} \\ & d_{k,2} & & d_{k,1} & & d_{k,3} \\ & & d_{k,3} & & d_{k,1} & d_{k,2} \end{bmatrix}, \quad x = \begin{bmatrix} \Delta_{I^{-1},11} \\ \Delta_{I^{-1},22} \\ \Delta_{I^{-1},33} \\ \Delta_{I^{-1},12} \\ \Delta_{I^{-1},13} \\ \Delta_{I^{-1},23} \end{bmatrix},$$ (21)

$$b_k = \hat{\omega} - I_{nom}^{-1} d_k$$

$$\hat{I}^{-1} = I_{nom}^{-1} + \hat{\Delta}_{I^{-1}}$$ (22)

By treating the gyroscopic term as a disturbance, we do not learn anything from it; we only try to keep it from negatively impacting the ID. This means that information is only present when thrusters are firing, and no information comes during coasting periods. Depending on the spacecraft inertia properties and typical angular rates, this term may be significant enough as compared to noise and disturbances to warrant direct treatment in the ID, as is shown later. The magnitude of the gyroscopic term is greater for asymmetric spacecraft, and for high angular rates about more than one principal axis.

The regression form equation for inertia-matrix ID using gyros only, where the gyroscopic term is treated as a disturbance is:

$$A_k = \begin{bmatrix} \dot{\hat{\omega}}_{k,1} & & & \dot{\hat{\omega}}_{k,2} & \dot{\hat{\omega}}_{k,3} \\ & \dot{\hat{\omega}}_{k,2} & & \dot{\hat{\omega}}_{k,1} & & \dot{\hat{\omega}}_{k,3} \\ & & \dot{\hat{\omega}}_{k,3} & & \dot{\hat{\omega}}_{k,1} & \dot{\hat{\omega}}_{k,2} \end{bmatrix}, \quad x = \begin{bmatrix} \Delta_{I,11} \\ \Delta_{I,22} \\ \Delta_{I,33} \\ \Delta_{I,12} \\ \Delta_{I,13} \\ \Delta_{I,23} \end{bmatrix},$$ (23)

-continued $$b_k = d_k - I_{nom}\dot{\hat{\omega}}_k$$

The regression form equation for inertia-matrix ID using gyros only, where the gyroscopic term is treated as significant is:

$$A_k =$$ (24)

$$\begin{bmatrix} \dot{\hat{\omega}}_1 & -\hat{\omega}_2\hat{\omega}_3 & \hat{\omega}_2\hat{\omega}_3 & \dot{\hat{\omega}}_2 - \hat{\omega}_1\hat{\omega}_3 & \dot{\hat{\omega}}_3 + \hat{\omega}_1\hat{\omega}_2 & \hat{\omega}_2^2 - \hat{\omega}_3^2 \\ \hat{\omega}_1\hat{\omega}_3 & \dot{\hat{\omega}}_2 & -\hat{\omega}_1\hat{\omega}_3 & \dot{\hat{\omega}}_1 + \hat{\omega}_2\hat{\omega}_3 & \hat{\omega}_3^2 - \hat{\omega}_1^2 & \dot{\hat{\omega}}_3 - \hat{\omega}_1\hat{\omega}_2 \\ -\hat{\omega}_1\hat{\omega}_2 & \hat{\omega}_1\hat{\omega}_2 & \dot{\hat{\omega}}_3 & \hat{\omega}_1^2 - \hat{\omega}_2^2 & \dot{\hat{\omega}}_1 - \hat{\omega}_2\hat{\omega}_3 & \dot{\hat{\omega}}_2 + \hat{\omega}_1\hat{\omega}_3 \end{bmatrix}_k,$$

$$x = \begin{bmatrix} \Delta_{I,11} \\ \Delta_{I,22} \\ \Delta_{I,33} \\ \Delta_{I,12} \\ \Delta_{I,13} \\ \Delta_{I,23} \end{bmatrix},$$

$$b_k = a_k + c_k \times \hat{\Delta}_C - I_{nom}\dot{\hat{\omega}} - \hat{\omega} \times (I_{nom}\hat{\omega}) = a_k + c_k \times \hat{\Delta}_C - A_k \begin{bmatrix} I_{nom,11} \\ I_{nom,22} \\ I_{nom,33} \\ I_{nom,12} \\ I_{nom,13} \\ I_{nom,23} \end{bmatrix}$$

$$\hat{I} = I_{nom} + \hat{\Delta}_I$$ (25)

This is the preferred embodiment for identification of inertia properties since it is the only one of the three to directly address the gyroscopic term, and it can be updated during coasting rotations. However, if the spacecraft symmetry and typical angular rates make the gyroscopic term negligible, there is no advantage over the other approaches.

The regression form equation for thruster-magnitude ID using rotational and translational measurements is:

$$A_k = \begin{bmatrix} (\hat{L} \times D)S_k \, diag(T_k) \\ DS_k \, diag(T_k) \end{bmatrix}, \quad x = diag(F_{bias}),$$ (26)

$$b_k = \begin{bmatrix} \hat{I}\dot{\omega} + \omega \times (\hat{I}\omega) \\ m\ddot{x}^{body} \end{bmatrix} - A_k \, diag(F_{nom})$$

$$\hat{L} = J - (C_{nom} + \hat{\Delta}_C)[1 \, 1 \, \ldots \, 1]$$ (27)

If both gyros and accelerometers are available and used for ID, they should be weighted accordingly (e.g., based on the relative accuracy in translational vs. rotational accelerations).

The equations derived represent the relationship between variables at each sample update. So at each k update, and for each ID to be updated, the corresponding $A_k$ matrix and $b_k$ vector are created and run through the individual RLS ID.

As with any system ID, the result is only as good as the data used. In particular, the spacecraft example is dependent on accurate values for angular acceleration, $\dot{\omega}_k$. Special care should be taken to estimate that as accurately as possible. Similarly, several aspects of the thruster model are assumed to be perfectly known (directions, scale factor, locations)—they should be calibrated carefully since imprecision can lead to biased ID results.

Having shown preferred embodiments for the general form of the invention and as applied to a specific application, those skilled in the art will realize many variations are possible which will still be within the scope and spirit of the claimed invention. Therefore, the scope of the invention is to be limited only as indicated by the following claims.

The invention claimed is:

1. A computer program product embodied on a computer readable medium having stored thereon instructions which when executed will perform a method for estimating a set of unknown parameters in a system having a set of governing equations describing its behavior that cannot be put into regression form with said unknown parameters linearly represented and measurements that are sampled regularly, the method comprising:
   (a) segmenting the set of said unknown parameters into a plurality of predetermined subsets wherein each individual subset of said unknown parameters is isolated linearly by manipulation of said equations; and
   (b) estimating concurrently and independently each said individual subset of said unknown parameters, thereby enabling simultaneous estimation of all unknown parameters,
   wherein said unknown parameters are treated as being perfectly known by estimating independently each said individual subset of unknown parameters thereby providing unknown parameter values.

2. The computer program product of claim 1, further comprising controlling when to update Unknown parameter subset estimates and when to ignore a set of said measurements.

3. The computer program product of claim 1, further comprising enabling additional robustness to anomalous data by allowing nominal values, or values calculated with algorithms that are robust to the anomalous data, in place of at least one of said unknown parameter values when an anomaly is detected.

4. The computer program product of claim 1, wherein said computer program product is implemented on-board a system to provide real-time parameter updates for on-board processes including one or more of control, estimation, navigation and fault tolerance.

5. The computer program product of claim 1, wherein said computer program is implemented on a processor separate from said system, and wherein said system communicates measurements and results to said processor.

6. The computer program product of claim 1, further comprising adjusting inputs to said system to minimize any negative impact on overall system performance, the method comprising: evaluating the unknown parameters most requiring improved estimation; selecting system trajectories or inputs that improve the estimation for these parameters, while balancing other system requirements; and implementing the optimally selected system inputs.

7. The computer program product of claim 1, further comprising calculating updated nominal values associated with a subset, wherein said subset comprises said parameters undergoing predetermined changes in time; estimating the deviation of said parameters from their nominal values; and identifying said unknown parameters when said nominal values are updated.

8. The computer program product of claim 7, wherein the system is a thruster-controlled spacecraft, and said changes are derived from the depletion of fuel mass.

9. The computer program product of claim 1, wherein said system is a spacecraft, the unknown parameters comprising: the six independent parameters of the spacecraft inertia matrix, as measured about the center of mass; the six independent parameters of the inverse of said inertia matrix; and the magnitude of thrust produced by each thruster.

10. The computer program product of claim 9, wherein vehicle inertia properties and motions generate both insignificant and significant gyroscopic effects, said significant gyroscopic effects enabling identification of said inertia matrix to continue during periods of coasting between thruster firings.

11. The computer program product of claim 9, wherein the spacecraft is thruster-controlled.

12. The computer program product of claim 9, wherein the computer program is implemented on a main spacecraft processor, wherein said main spacecraft processor is on-board the spacecraft.

13. The computer program product of claim 9, wherein the computer program is implemented on-board the spacecraft, the spacecraft having a main processor and a secondary processor communicating with the main processor, wherein the method is stored and run on the secondary processor.

14. The computer program product of claim 9, wherein the computer program is implemented on a main spacecraft processor, wherein said main spacecraft processor is on-board the spacecraft further comprising performing at a ground station said calculations based on telemetry from the spacecraft and transmitting the calculated results back to the spacecraft.

15. The computer program product of claim 9, wherein said measurements are obtained from sensors, wherein the sensors are at least one of gyroscopes, accelerometers, star trackers, sun sensors, horizon sensors, video cameras, directional antennae, radar or other measurement devices that directly or indirectly measure spacecraft motion.

* * * * *